Nov. 15, 1966     C. A. HELQUIST     3,285,379

FLUID PRESSURE CLUTCH WITH SPRING CUSHION

Filed Oct. 21, 1964     2 Sheets-Sheet 1

INVENTOR:
CARL A. HELQUIST
BY
ATTORNEY

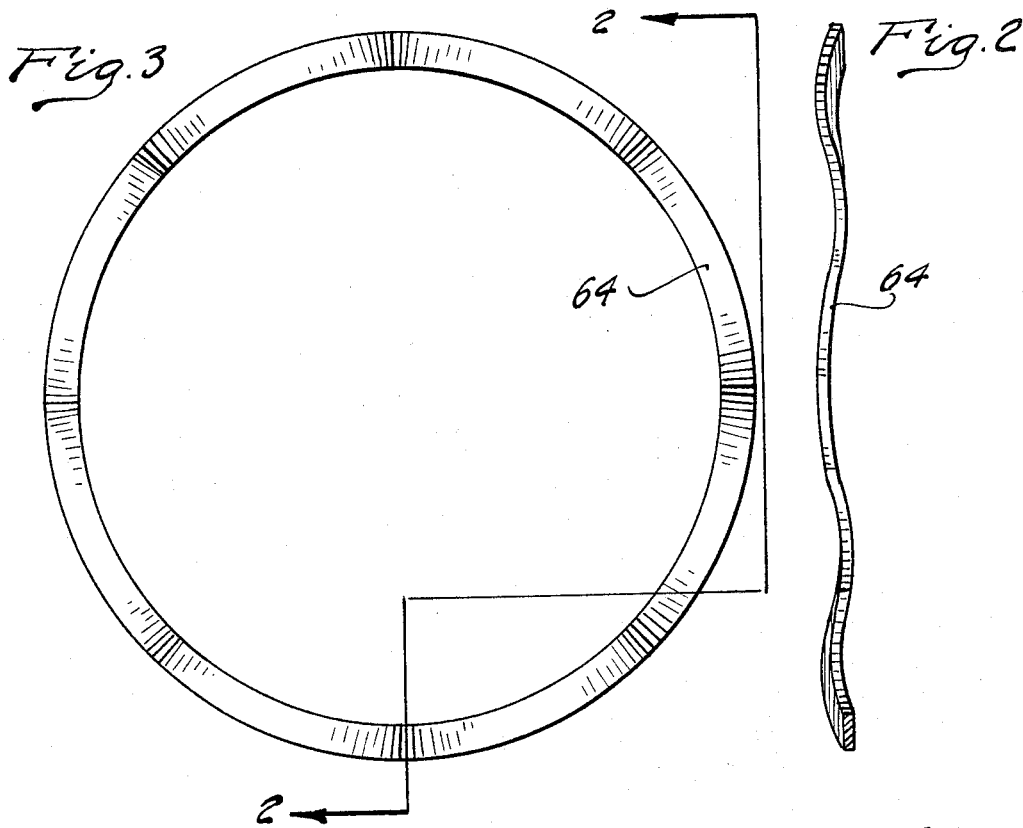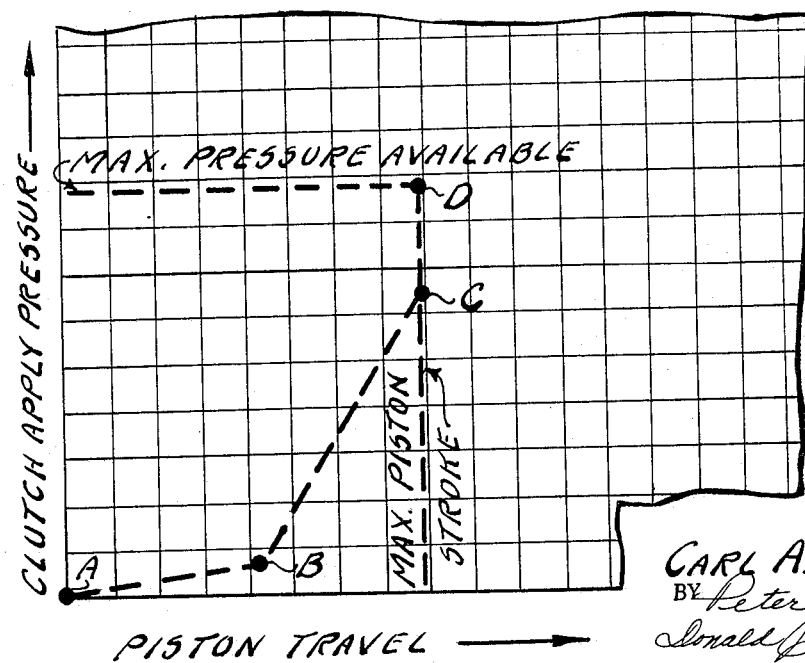

3,285,379
FLUID PRESSURE CLUTCH WITH SPRING CUSHION
Carl A. Helquist, Birmingham, Mich., assignor to Ford Motor Company, Dearborn, Mich., a corporation of Delaware
Filed Oct. 21, 1964, Ser. No. 405,357
4 Claims. (Cl. 192—85)

My invention relates generally to a friction disc clutch assembly having a fluid pressure operated clutch actuator servo. More particularly it relates to a friction disc clutch assembly capable of being used with a power take-off mechanism in a power delivery driveline for a tractor vehicle. When used in an environment of this type, it is capable of delivering power from a tractor engine to farm implements through a power take-off shaft.

Power take-off mechanisms for powering farm implements must be calibrated for a variety of loads. Provision must be made, for example, for cushioning the power take-off clutch application in order to avoid shock loading of the implement that is being used. This is accomplished in certain power take-off drivelines of known construction by modulating the clutch pressure made available to the power take-off clutch so that full clutch pressure will not be made available immediately upon clutch application. This requires an operator controlled valve system that will enable the operator to obtain the rate of application that is best suited for the power delivery requirements of the particular implement that is being used. This, of course, requires operator training. A mode of operation of the farm implements then is dependent upon the operator's driving habits.

In my improved system I have provided a power take-off clutch assembly that satisfies the particular requirements of tractor engine driven farm implements, but I have done this without the need for including an operator controlled valve system. The power take-off clutch assembly itself is located in the so-called center housing for the tractor power transmission mechanism. The center housing is located at the power output end of the multiple speed ratio power transmission gearing that is used to deliver engine torque to the power output shaft and the traction wheels. A driving connection between the engine and a positive displacement pump also is situated in the driveline center housing, and passage structure is provided for distributing directly the fluid pressure developed by the engine driven pump to the power take-off clutch assembly. A simple selector valve assembly that is under the control of the vehicle operator is situated in and partly defines this passage so that fluid pressure can be admitted to the pressure operated servo for the power take-off clutch assembly or exhausted therefrom as desired. The pressure need not be modulated to eliminate shock loading of the power take-off driveline. The provision of a clutch arrangement of this type is a principal object of my invention.

In carrying forth the foregoing object I have provided a clutch housing that is internally splined to receive externally splined clutch discs. The companion clutch member, which is externally splined, carries internally splined clutch discs that are situated in interdigital relationship with respect to the externally splined discs. The housing is formed with an annular cylinder within which is received an annular piston, the cylinder and piston cooperating to define a pressure chamber that is in fluid communication with the control pressure passage described previously. When the pressure chamber is pressurized, the piston moves the discs of the clutch assembly into engagement with a pressure plate and causes the discs to become frictionally engaged.

The annular piston is formed with an annular groove in the piston face that engages the clutch discs. Located within that annular groove is a circular spring having axially displaced undulations. The crests of the undulations are adapted to engage the disc as the piston is advanced upon distribution of pressure to the clutch pressure chamber. The spring is designed with a relatively high rate so that the clutch may assume a driving condition under the influence of the spring force that is created upon deflection of the spring prior to engagement of the piston face with the clutch discs. As the spring deflects, the clutch apply force increases due to the spring rate, which is relatively high. In one operating embodiment, the spring rate may be between 40,000 and 50,000 pounds per inch.

If the engine driven implement can be driven easily, the friction discs will assume a locked-up driving condition before the piston will have assumed its final clutch-engaging position, the latter corresponding to the point at which the piston bottoms out against the clutch discs. When this occurs, there will be no shock loading since the inertia torque of the drive-line due to the differential speeds of the driving and driven members will have been dissipated. In those instances when the driving resistance of the implement is unusually large, it is possible that the friction discs will not have assumed a fully locked condition, although they will be capable of transmitting a major percentage of the torque necessary to drive the implement prior to the time the piston engages the clutch discs. But even in these cases a relatively large percentage of the driveline inertia torque due to the relative rotation of the driving and driven masses is dissipated, and shock loading thus is reduced correspondingly.

I am aware of certain clutch constructions in other driveline applications that employ accumulator springs which are located between the discs of the multiple disc clutch assembly and the clutch servo actuator piston. One such arrangement includes a Belleville-type spring arranged coaxially with respect to the annular piston. One margin of the spring engages the piston and the other margin engages the adjacent clutch disc. If the spring has a low spring rate, an accumulator action is introduced as the piston advances toward the clutch disc assembly following introduction of clutch pressure to the working chamber of the servo. This is followed by a rapid increase in the pressure apply force as the Belleville spring reaches its maximum deflection, the piston thereafter being adapted to transfer force directly to the clutch disc assembly. Such a construction is not particularly suited for driveline installations of the type with which applicant now is concerned. If in a tractor power take-off driveline the deflection characteristics of the Belleville spring are chosen to provide an accumulator action at a relatively low servo pressure, an abrupt change in the inertia in the driveline would be experienced as the piston engages the clutch pressure plate. On the other hand, if the spring is designed so that the accumulator action will take place only at an increased clutch servo pressure, the initial shock loading that is developed during the initial phases of the clutch apply interval is just as undesirable as the corresponding shock loading that would occur in the previous case in the final stages of the clutch apply interval. But regardless of the spring rate that is chosen, the margin of the Belleville spring causes line contact with the adjacent disc, and that disc in turn engages its adjacent disc with line contact. This causes high local loading of the friction surfaces and premature failure due to wear occurs.

In contrast to clutch constructions of this type, I have provided a cushioning spring means for causing the clutch apply force to be developed progressively from a relatively low value to a relatively high value as the pressure in the clutch working chamber is increased and as the piston is stroked. The driveline thus can accommodate any of a variety of power take-off loads regardless of magnitude. This greatly increases the utility of the power take-off mechanism and at the same time substantially reduces design costs and operating maintenance.

In another clutch arrangement that sometimes is used, a series of coiled compression springs is carried by the annular piston. These springs are adapted to engage the elements of the clutch disc assembly as the piston is advanced toward a clutch engaging position. Such arrangements are unsatisfactory in the environment with which I now am concerned, however, since it would be necessary in such a case to provide an unreasonably large number of compression springs in order to produce the relatively high spring rate that is needed. Furthermore, the space required to accommodate coil-type compression springs greatly exceeds the space that is available in a commercial power take-off driveline. Notwithstanding these disadvantages, a coil spring type arrangement, of necessity, would be relatively expensive to manufacture and assemble in quantity production. The provision of a power take-off clutch assembly that will eliminate the shortcomings in such prior art mechanisms is another object of my invention.

In still other clutch constructions commonly used in such torque transmitting drive lines, a multiple disc clutch assembly is provided with an annular piston and cylinder assembly that functions as a disc engaging fluid pressure operated servo. A piston engages a pressure plate located intermediate a disc assembly and the piston, and the clutch applying forces are absorbed by a reaction member in the form of a reaction ring carried by one of the clutch elements. One or more Belleville springs are situated between the reaction ring and the discs of the clutch disc assembly for the purpose of softening the engagement of the clutch. In these arrangements the Belleville spring cannot yield unless the discs themselves slide axially along their respective splined connections with the driving and driven elements of the clutch assembly. This sliding action does not occur, however, until the piston has applied a clutch engaging force to the discs. Thus, the discs are required to slide upon their splines at the same time that they are transmitting torque to the assembly. This arrangement greatly accelerates wear of the splines and causes premature clutch failure. It is another object of my invention to provide a power take-off clutch structure that avoids this condition.

Further objects and features of my invention will become apparent from the following description and from the accompanying drawings, wherein:

FIGURE 2 is an end elevation view, taken along section line 2—2 of FIGURE 3, of the cushioning spring employed in the mechanism of FIGURE 1;

FIGURE 3 is a front elevation view of the spring of FIGURE 2; and

FIGURE 4 is a chart showing the engagement characteristics of the clutch structure of FIGURE 1.

Figure 1:
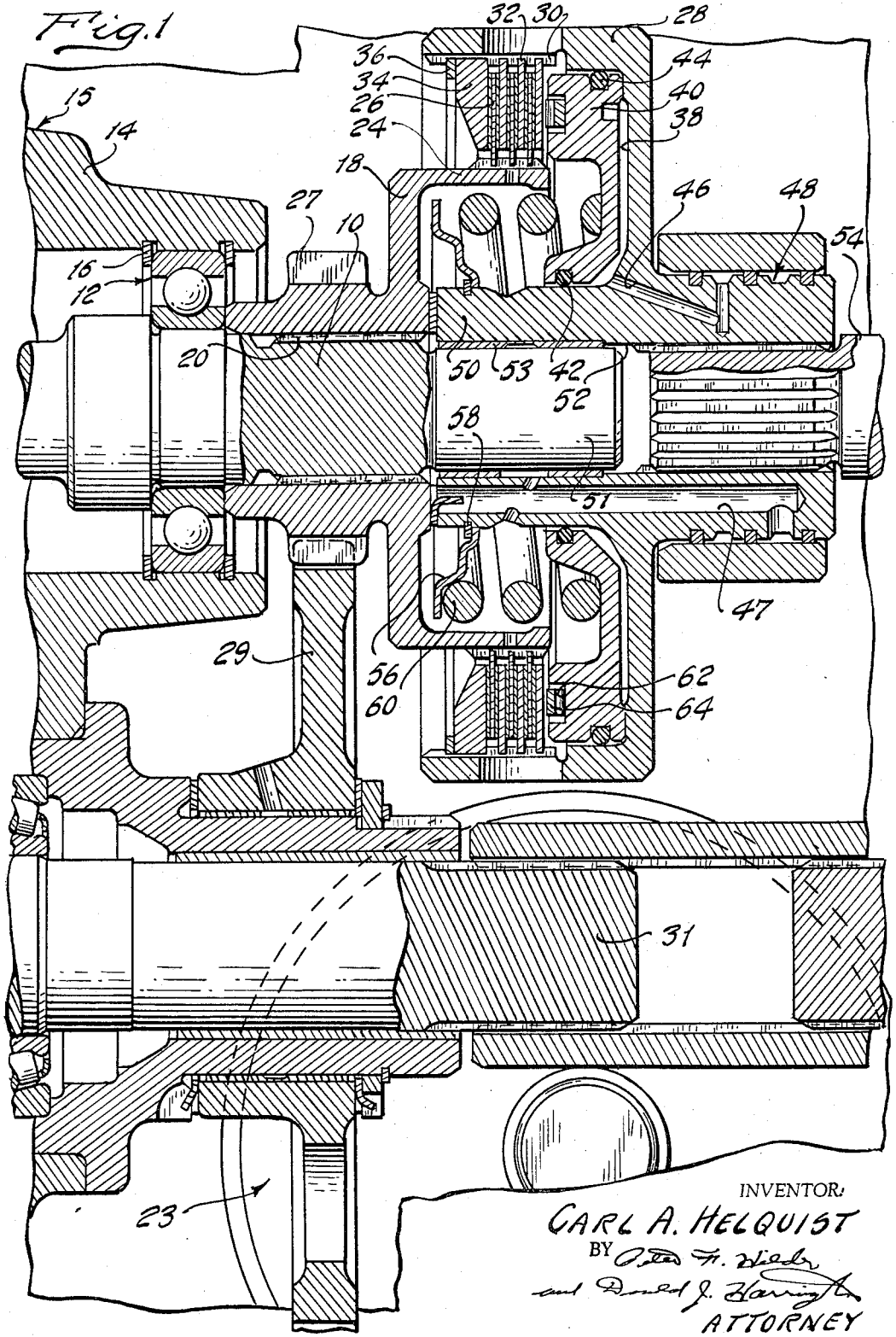
FIGURE 1 shows in longitudinal cross sectional form my improved power take-off mechanism.

Referring first to FIGURE 1, numeral 10 designates an engine powered shaft that may be journaled by a suitable bearing 12 in a stationary retainer 14 which is secured to a housing 15 for a tractor vehicle driveline. Housing 15 may be bolted at its periphery to the power output end of the housing for the power transmission mechanism. Bearing 12 may be retained in place by snap ring retainers 16.

A drive flange 18 is splined at 20 to the shaft 10. Its periphery forms an externally splined power input clutch element 24 which carries internally splined clutch discs 26. A first drive gear for a positive displacement fluid pump 23 is formed on the hub of flange 18 as shown at 27. It drivably engages a second drive gear 29 which is drivably connected to pump 23, the latter acting as a pressure source for the clutch structure of my invention.

Gear 29 is journaled for rotation about the axis of transmission power output shaft 31.

Surrounding element 24 is a clutch drum 28 having an internally splined periphery 30 that carries externally splined clutch discs 32. The discs 26 and 32 are situated in interdigital relationship to define a multiple disc assembly. A clutch reaction ring 34 is externally splined to the internally splined drum 28. It is held axially fast by means of a snap ring 36 secured within a suitable snap ring groove in the inner periphery of the drum 28.

Drum 28 defines an annular cylinder 38 within which is positioned an annular piston 40. Suitable sealing elements, which may be O-rings, are provided as shown at 42 and 44, on the inner and outer peripheries, respectively, of the piston 40.

The piston and cylinder cooperate the define a pressure chamber which is in communication with a clutch pressure feed passage 46.

A clutch drum mounting hub 48, which may be formed with a plurality of sealing grooves, extends from the right-hand side of the drum. It is adapted to be received within a cooperating opening formed in the housing of a fluid pressure distributor manifold. The passage 46 and a lubrication oil passage 47 receive fluid from the grooves of hub 48. The hub portion 50 of the drum 28 is formed with a central opening 52 that is internally splined to establish a splined connection with an externally splined power take-off shaft 54, the latter being received telescopically within the hub 50. The adjacent end 51 of shaft 10 also is received within opening 52 and is journaled therein by bushing 53.

The hub 50 carries a piston return spring back-up member 56 which is held axially fast upon the hub by means of a snap ring 58 located within a suitable snap ring groove. A coil-type piston return spring 60 is situated between the back-up member 56 and the piston 40.

The face of the piston 40 that is adjacent the multiple disc clutch assembly is formed with an annular groove 62. Located within this groove is a circular spring 64, the characteristics of which are best indicated in FIGURES 2 and 3. It will be apparent from an inspection of FIGURE 2 and 3 that the circular spring 64 is formed with undulations that extend axially with respect to the axis of the clutch assembly. The crests of these undulations extend beyond the clutch disc engaging surface of the piston while the disc of the multiple disc clutch assembly that is directly adjacent the piston serves as a pressure plate for the clutch disc assembly. As pressure is admitted to the cylinder 38, the piston is advanced until the crests for the undulations of the spring 64 engage the pressure plate. At that instant the clutch discs are moved into clutching engagement.

As clutch pressure continues to build up in the clutch working chamber, the spring will yield. The spring, however, is formed with a relatively high spring rate so that the clutch applying force increases relatively rapidly, although at a smooth and continuous rate, as the spring is flexed upon continued movement of the piston. If the driven load is relatively slight, the clutch discs will become fully locked at a time prior to the instant at which the piston itself engages the adjacent pressure plate.

The piston is caused to engage the adjacent pressure plate without a corresponding bottoming-out of the undulated spring. Thus the spring is not overstressed at any time during the clutch operating cycle. Since the groove 62 is of a greater depth than the axial thickness of the spring 64, a clearance always will exist between the bottom of the groove 62 and the spring itself when the clutch is fully applied.

In FIGURE 4 I have illustrated the engagement characteristics of the clutch structure of my invention. When clutch pressure initially is applied to the clutch working chamber, the piston is stroked from position A to position B with a slack take-up motion. The slope of this portion of the curve is due to compression of the return spring 60. At point B the crests of the undulations engage the pressure plate of the clutch disc assembly. Thereafter, the spring begins to yield thereby building up gradually the clutch pressure along a straight line which is an indicator of the spring rate.

At point C the piston is fully stroked and its working surface engages the adjacent clutch pressure plate. An immediate increase in clutch apply force then takes place as indicated by the vertical line C–D.

When the power take-off is operated under light loads, full clutch engagement can occur at any appropriate point along line B–C. In any event, clutch engagement will be complete, even with heavy loads, either along line B–C or at some point above point C but lower than point D.

Having thus described a preferred embodiment of my invention, what I claim and desire to secure by U.S. Letters Patent is:

1. A multiple disc clutch assembly comprising a driving element, a driven element, a first set of friction discs carried by one element, a second set of friction discs carried by the other element, said discs being situated in interdigital relationship, a reaction disc carried by said one element on one axial side of said discs, an annular cylinder defined by one of said elements, an annular piston situated with said cylinder and cooperating therewith to define a pressure chamber, said annular piston including a disc engaging surface proximate to but axially spaced from said discs, an annular groove formed in said piston surface, a circular piston spring situated in said annular groove, said spring being formed with undulations that extend axially with respect to the axis of said clutch disc assembly, the depth of said groove being substantially greater than the axial thickness of said spring.

2. In a power take-off driveline for a tractor vehicle engine, a power take-off clutch assembly comprising a first clutch element, a second clutch element, means for delivering engine torque to said first element, a power take-off shaft connected drivably to said second element, said second element being internally splined and said first element being externally splined, each clutch element having drivably connected thereto splined clutch friction discs, the friction discs for one element being situated in interdigital relationship with respect to the discs of the other element, said second element defining a clutch servo cylinder, an annular piston situated in said cylinder, said piston and cylinder cooperating to define a pressure chamber, passage means for distributing clutch apply pressure to said chamber, said piston having a clutch disc engaging surface situated directly adjacent said discs but axially spaced therefrom, an annular groove formed in said piston surface, and an undulated circular spring in said annular groove, the depth of said groove being greater than the axial thickness of said spring, the crests of the undulations of said spring being adapted to engage said clutch disc assembly upon movement of said piston toward said clutch discs, said spring being deflected following engagement of the crests of said undulations as said piston continues its movement under the influence of clutch pressure toward said discs, said spring being characterized by a relatively high spring range whereby the clutch apply force increases at a regular but substantial rate whereby a torque delivery path is established through said power take-off driveline with a minimum degree of shock loading due to inertia forces.

3. A multiple disc clutch assembly comprising a driving element, a driven element, a first set of friction discs carried by one element, a second set of friction discs carried by the other element, said discs being situated in interdigital relationship, a reaction disc carried by said one element on one axial side of said discs, an annular cylinder defined by one of said elements, an annular piston situated with said cylinder and cooperating therewith to define a pressure chamber, said annular piston including a disc engaging surface proximate to but axially spaced from said discs, an annular groove formed in said piston surface, a circular piston spring situated in said annular groove, said spring being formed with undulations that extend axially with respect to the axis of said clutch disc assembly, the depth of said groove being substantially greater than the axial thickness of said spring, said cylinder being formed with a hub, a spring seat member carried by said hub, and a coiled compression spring situated between said piston and said seat member for urging said piston to a clutch disengaging position with a precalibrated force.

4. In a power take-off driveline for a tractor vehicle engine, a power take-off clutch assembly comprising a first clutch element, a second clutch element, means for delivering engine torque to said first element, a power take-off shaft connected drivably to said second element, said second element being internally splined and said first element being externally splined, each clutch element having drivably connected thereto splined clutch friction discs, the friction discs for one element being situated in interdigital relationship with respect to the discs of the other element, said second element defining a clutch servo cylinder, an annular piston situated in said cylinder, said piston and cylinder cooperating to define a pressure chamber, passage means for distributing clutch apply pressure to said chamber, said piston having a clutch disc engaging surface situated directly adjacent said discs but axially spaced therefrom, an annular groove formed in said piston surface, an undulated circular spring in said annular groove, the depth of said groove being greater than the axial thickness of said spring, the crests of the undulations of said spring being adapted to engage said clutch disc assembly upon movement of said piston toward said clutch discs, said spring being deflected following engagement of the crests of said undulations as said piston continues its movement under the influence of clutch pressure toward said discs, said spring being characterized by a relatively high spring range whereby the clutch apply force increases at a regular but substantial rate whereby a torque delivery path is established through said power take-off driveline with a minimum degree of shock loading due to inertia forces, said cylinder being formed with a hub, a spring seat member carried by said hub, and a coil compression spring situated between said piston and said seat member for urging said piston to a clutch disengaging position with a precalibrated force.

References Cited by the Examiner

UNITED STATES PATENTS

| 2,244,169 | 6/1941 | Miller | 192—109 X |
| 2,599,214 | 6/1952 | Wemp | 192—89 |
| 2,799,375 | 7/1957 | Forster | 192—85 |
| 2,965,207 | 12/1960 | Snyder | 192—85 X |
| 3,054,491 | 9/1962 | Block et al. | 192—109 X |

DAVID J. WILLIAMOWSKY, *Primary Examiner.*

BENJAMIN W. WYCHE III, *Examiner.*